United States Patent
Robinson

(10) Patent No.: US 6,533,505 B1
(45) Date of Patent: Mar. 18, 2003

(54) DEBURRING TOOL

(75) Inventor: William Robinson, Plymouth, MI (US)

(73) Assignee: EZ Burr Tool Company, Plymouth, MI (US)

( * ) Notice: Subject to any disclaimer, the term of this patent is extended or adjusted under 35 U.S.C. 154(b) by 0 days.

(21) Appl. No.: 10/035,775

(22) Filed: Oct. 22, 2001

(51) Int. Cl.⁷ .............................................. B23B 51/00
(52) U.S. Cl. ...................... 408/1 R; 408/156; 408/211; 408/713; 408/714
(58) Field of Search ................................ 408/1 R, 154, 408/155, 156, 713, 714, 187, 181, 211, 226

(56) References Cited

U.S. PATENT DOCUMENTS

| | | | | |
|---|---|---|---|---|
| 2,895,356 A | * | 7/1959 | Cogsdill | 408/200 |
| 3,166,958 A | * | 1/1965 | Cogsdill | 408/147 |
| 3,306,136 A | * | 2/1967 | Gustkey | 408/226 |
| 4,086,018 A | * | 4/1978 | Robinson et al. | 408/226 |
| 4,147,463 A | * | 4/1979 | Robinson | 408/156 |
| 5,277,528 A | * | 1/1994 | Robinson | 408/201 |
| 5,358,363 A | | 10/1994 | Robinson | |
| 5,501,554 A | | 3/1996 | Robinson et al. | |
| 5,755,538 A | | 5/1998 | Heule | |
| 5,803,679 A | | 9/1998 | Heule | |

\* cited by examiner

*Primary Examiner*—Daniel W. Howell
(74) *Attorney, Agent, or Firm*—Reising, Ethington, Barnes, Kisselle, Learman & McCulloch, P.C.

(57) ABSTRACT

A deburring tool capable of removing burrs and placing chamfers on circumferential edges surrounding both front and back side openings of a borehole, wherein the tool includes an elongated cylindrical arbor, a resilient arm section, and a replaceable cutting insert. In use, the rotating deburring tool is steadily advanced in a forward axial direction until the replaceable cutting insert encounters the circumferential edge of a front side opening, whereby the tool removes any burrs and creates a chamfer on that opening. Continued forward axial movement causes the replaceable cutting insert to retract within the arbor such that the tool continues through the borehole without damaging its interior surface. As the tool emerges from the back side opening of the borehole, the replaceable cutting insert is again allowed to extend out of the arbor and into a deburring position. At this point, forward axial movement is stopped, and the direction of the tool is reversed such that it may deburr and chamfer the backside opening just as it had the frontside. Furthermore, the cutting insert is located at the forward end of a resilient arm section such that it can be easily replaced when it becomes worn without having to replace additional components.

12 Claims, 2 Drawing Sheets

DEBURRING TOOL

FIELD OF THE INVENTION

The invention relates generally to a deburring tool for removing burrs from the circumferential edge of a borehole, and more particularly, to a deburring tool having a replaceable cutting insert.

BACKGROUND OF THE INVENTION

Prior to the present invention, various special tools have been disclosed for removing burrs from the circumferential edge surrounding openings of passages and for adding chamfers thereon. Examples of such tools are disclosed in U.S. Pat. Nos. 5,358,363 and 5,501,554 which are entitled Deburring Tool and issued Oct. 25, 1994 and Mar. 26, 1996, respectively, to William A. Robinson, the inventor of the present invention. These U.S. Patents are incorporated by reference.

The deburring tool shown in the '363 patent generally includes an elongated cylindrical arbor formed with a cutting blade recess. A unitary cutting tool is received in the recess and includes a cutting head with an integral, elongated, flat, resilient blade extending therefrom. The blade is mounted in the arbor by a pair of axially spaced pins, at least one of which, the pivot pin, extends through a hole in the blade to define a pivot point about which the blade can flex. The other pin engages the end of the blade opposite the cutting head and holds this end in a fixed relationship with respect to the arbor, such that the cutting head projects from the recess to engage a workpiece. The cutting head is thereby resiliently yieldable to permit the cutting head to move inwardly with respect to the recess during a deburring operation. When the cutting tool becomes worn out or otherwise damaged, the pin securing the blade in a fixed relationship is loosened such that the entire cutting tool may be replaced. Though deburring tools of this type perform quite satisfactorily, a deburring tool having an easily replaceable cutting insert, as opposed to an entire replaceable cutting tool, would be preferable for improved economy and efficiency.

Other examples of deburring tools are disclosed in U.S. Pat. Nos. 5,803,679 issued Sep. 8, 1998 to Ulf H. Heule for a Deburring Tool for Deburring the Edges of Boreholes and U.S. Pat. No. 5,755,538 issued May 26, 1998 to Ulf Heule for a Deburring Tool. While the prior art patents '679 and '538 disclose deburring blades in tool holders, they require separate compression springs operating either through a spring plate and a control pin or a spring pocket formed in the blade for radially urging the cutting blade out of a radial blade mounting window.

In contrast to the prior art constructions, the present invention is drawn to a new and improved deburring tool construction of the resilient arm type in which a cutting insert can be readily removed and replaced on the outer end of a resilient arm.

SUMMARY OF THE INVENTION

According to the invention, a deburring tool for deburring an opening of a borehole is provided comprising an elongated cylindrical arbor, a mounting pin, a pivot pin, a resilient arm, and a replaceable cutting insert. The elongated cylindrical arbor includes a forward axial end, a rearward axial end, and a longitudinal slot extending between the forward and rearward ends. The mounting pin is inserted into the arbor and is located at an axial position between the forward and rearward ends of the arbor. The pivot pin is inserted into the arbor and is located at an axial position between the forward end of the arbor and the mounting pin. The resilient arm is received in the longitudinal slot and includes a terminal end for coupling the resilient arm to the arbor via the mounting pin, an attachment end, and a pivot recess for allowing the resilient arm to flex about the pivot pin. Lastly, the replaceable cutting insert includes a forward cutting edge and an attachment recess for receiving the attachment end of the resilient arm. The replaceable cutting insert radially extends out of the longitudinal slot when the deburring tool is not engaging the borehole and the replaceable cutting insert radially retracts within the longitudinal slot when the deburring tool is engaging the borehole.

According to another aspect of the invention, a method for replacing a cutting insert of a deburring tool is provided and includes the following steps. (a) providing a deburring tool which includes an elongated cylindrical arbor, a pivot pin including a first locking feature, a resilient arm including a pivot recess with a second locking feature, and a cutting insert attached to the resilient arm. (b) adjusting at least one of the first and second locking features such that the resilient arm becomes unattached from the pivot pin. (c) extending the unattached resilient arm and the cutting insert out of the arbor. And, (d) replacing the cutting insert.

The deburring tool of the present invention having a replaceable cutting insert has several advantages over the prior art deburring tools. Firstly, the resilient arm flexes around the pivot pin according to the amount of pressure being exerted by a borehole, thus providing a simple, effective, and robust tool capable of deburring openings of a borehole. Secondly, the replaceable nature of the cutting insert allows just the cutting insert to be replaced when it becomes worn out, thus avoiding the unnecessary disposal of other components.

BRIEF DESCRIPTION OF THE DRAWINGS

These and other advantages and features of the invention will be readily appreciated as the same becomes better understood by reference to the following detailed description when considered in connection with the accompanying drawings, wherein.

DETAILED DESCRIPTION OF THE PREFERRED EMBODIMENT

The deburring tool of the present invention is similar to the designs seen in U.S. Pat. Nos. 5,358,363 and 5,501,554, and generally comprises an elongated, cylindrical device that is inserted into a machine spindle and driven by a machine that rotates the tool at a high velocity while advancing and reversing the tool in an axial direction. The deburring tool is capable of removing burrs and placing chamfers on circumferential edges surrounding both a front side and a back side opening of a borehole, such as that found in numerous automotive components. In use, the rotating deburring tool is steadily advanced in a forward axial direction until it encounters the circumferential edge of a front side opening of the borehole. As cutting portions of the deburring tool contact the circumferential edge, the tool removes any burrs and begins creating a chamfer on that opening. Continued forward axial movement of the tool causes the tool's cutting portions to retract within the tool such that the deburring tool continues through the borehole without scoring or otherwise damaging the interior surface of the borehole. As the deburring tool emerges from the back side opening of the borehole, the cutting portions of the tool are again allowed to extend out of the tool body and into a deburring position. At this point, the forward axial movement of the tool is stopped, and the tool begins to back up in a reverse axial direction such that it may deburr and chamfer the backside opening of the borehole. Again, as the cutting portions of the deburring tool contact the circumferential edge surrounding the back side opening, the rotating tool removes all burrs and chamfers the opening while retracting back within the tool. Continued reverse axial movement causes the tool to travel back through the borehole, emerge from the front side opening, and return to its original position. The deburring tool 10 of the present invention improves both the operation and the maintenance of the tool and generally includes an elongated cylindrical arbor 12, a resilient arm 14, and a replaceable cutting insert 16.

Figure 1:
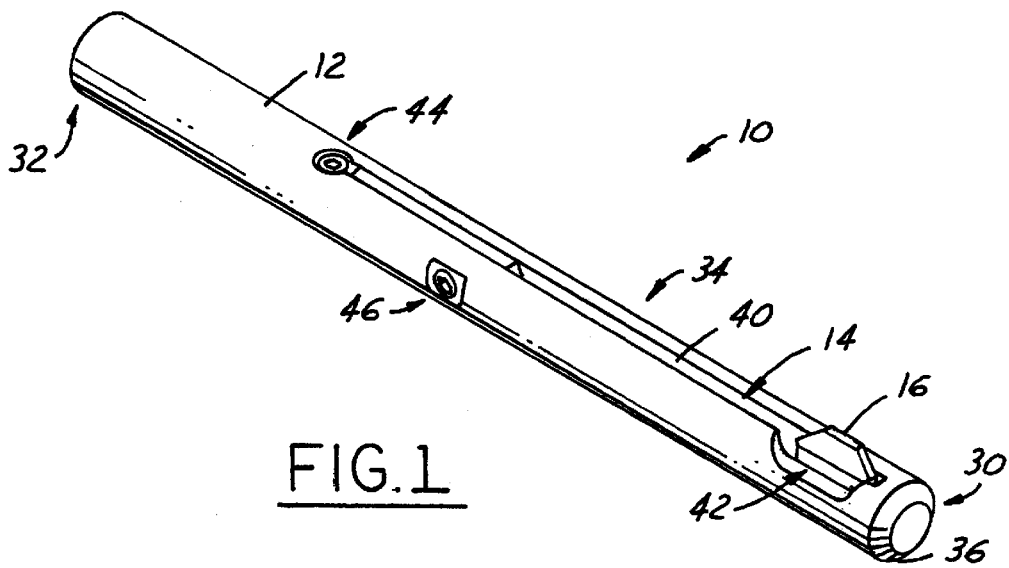
FIG. 1 is a pictorial view of the deburring tool of the present invention.
Figure 2:
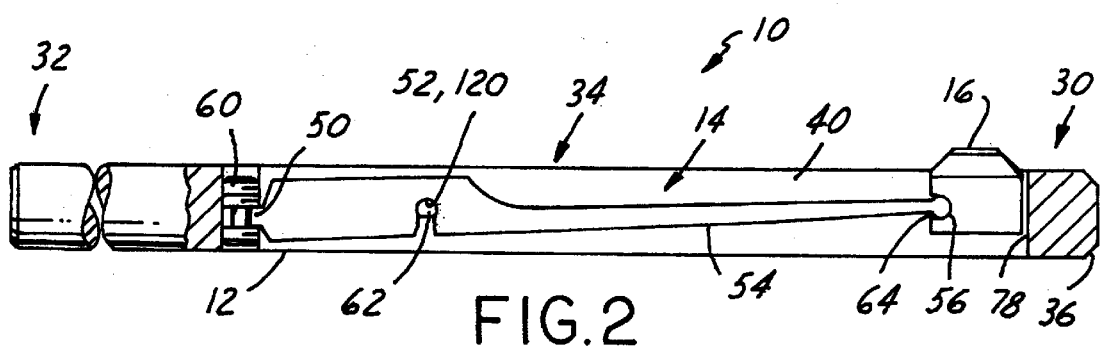
FIG. 2 is a cutaway view of the deburring tool seen in FIG. 1.

Referring now to FIGS. 1 and 2, deburring tool 10 of the present invention is seen from both a perspective and a cut away view, respectively. The arbor 12 is a smooth, elongated, cylindrical device that includes a forward axial end 30, a rearward axial end 32, and a thin longitudinal slot 34. Preferably, arbor 12 is composed of a high strength metal alloy which gives the arbor the structural integrity needed. The length and diameter of the arbor depend on the application for which it is used. For example, if the intended application includes deburring both the front and back sides of a rather long borehole, the axial length of the arbor would need to at least be that long, for the arbor must be long enough to advance through the borehole such that the replaceable cutting insert 16 emerges from the opening on the back side. Similarly, the inner diameter of the borehole being worked will determine the outer diameter of the arbor, for the deburring tool will not fit through the borehole if the arbor has a greater diameter than that of the borehole through which it must pass.

At the very end of forward axial end 30, the outer diameter of the arbor has been reduced such that a taper 36 is formed. The taper aids in guiding the deburring tool into the front side opening of the borehole when the deburring tool is being advanced in the forward axial direction. Rearward axial end 32 is designed to be received in a tool mount, such as a chuck, located on the machine responsible for rotating and driving the axial movement of the tool. In an alternative embodiment from that seen in the Figures, rearward axial end 32 could be comprised of an axial segment that has a diameter greater than or less than the other axial portions of the arbor. Also, instead of the rearward axial end having a smooth cylindrical surface, it could include flattened surfaces that contribute to the retention of the tool within the rotating machine. The longitudinal slot 34 is designed to receive resilient arm 14 and cutting insert 16 such that, in operation the arm and cutting insert can extend out of and retract within the slot.

The longitudinal slot generally comprises a main slot portion 40, a cutting recess 42, a mounting pin bore 44, and a pivot pin bore 46. The main slot portion 40 extends between the cutting recess 42 and the mounting pin bore 44 and has an axial length great enough to accommodate the length of the resilient arm section. The width of the main slot portion is slightly greater than the width of the resilient arm, thereby allowing the resilient arm to pivotally move within the main slot portion, yet establishing a tolerance tight enough that debris and shavings are prevented from wedging between the two components. In the preferred embodiment; the main slot portion has a generally rectangular cross-sectional shape and radially extends all the way through the deburring tool such that in the absence of the resilient arm and cutting insert, one could see through the arbor via slot 34. The axial length of the main slot portion can vary widely, depending upon the particular deburring application at hand. Cutting recess 42, located near the forward axial end of longitudinal slot 34, is a recessed portion of slot 34 that prevents a shaving or other scrap creating during the deburring process from wedging with the cutting insert . The cutting recess is located on the leading rotational side of cutting insert 16, meaning that as the tool rotates in a clockwise direction, cutting recess 42 encounters the surface being deburred or chamfered before the cutting insert 16. The cutting recess improves the tool's ability to avoid any shavings or other scrap that may otherwise get caught up between the cutting insert and the inner walls of the slot thereby preventing the resilient arm and cutting insert from pivoting. As the cutting insert contacts the circumferential edge of a borehole, the radially inward force exerted by the borehole edge against the cutting insert forces the cutting insert to retract within the slot. Any shavings, burrs, etc. that may be caught up on the leading rotational side of the cutting insert are simply carried to the cutting recess instead of binding within the slot, thereby decreasing the downtime of the tool. Mounting pin bore 44 is a threaded, cylindrical borehole that extends traverse to and completely through the longitudinal axis of the arbor and is designed to threadingly receive an adjustable mounting pin. Pivot pin bore 46 is also a threaded borehole that extends through arbor 12 such that it is both transverse to the longitudinal axis of the arbor and to mounting pin bore 44, the function of which will be described next.

Resilient arm 14 is an elongated, flexible arm section designed to pivotally carry the cutting insert such that the cutting insert may extend from and be retracted within slot 34. The resilient arm is preferably cut with a wire electrical discharge machine (EDM) and includes a terminal end 50, pivot recess 52, 120, flexible arm section 54, and an attachment end 56. Again, as stated with reference to the length of the longitudinal slot, the overall length of the resilient arm is dependent upon many factors most of which are dictated by the particular application that the deburring tool is being used for. Terminal end 50 is located at the rearward axial end of the resilient arm and has a reduced width such that a mounting pin 60 is capable of fixedly securing that end of the resilient arm in place. As best seen in FIG. 2, mounting pin 60 is threaded at both ends so that the pin may be adjusted within the borehole, however, the mounting pin also has a reduced diameter, non-threaded portion towards the center of the pin. This non-threaded portion is sized to receive the terminal end 50 of the resilient arm such that the depth of the terminal end within the slot can be adjusted by using a suitable tool to threadingly adjust the mounting pin. The position of the terminal end within the mounting pin bore is used to adjust the extent with which cutting insert 16 extends out of slot 34; such extent can be increased or reduced by adjustment of the mounting pin.

Pivot pin 62 is located in the pivot pin bore and acts as a pivot point about which the resilient arm may flex. As seen in FIG. 2, the pivot pin is located within the arbor at an axial position just rearward of the beginning of flexible arm section 54. The axial segment of the resilient arm 14 extending between terminal end 50 and pivot pin 62 has a greater width than flexible arm section 54, and thus does not easily flex. At an axial position just forward of the pivot pin, however, the width of the resilient arm decreases thus forming flexible arm section 54 which extends from the pivot pin to attachment end 56. This reduction in thickness contributes to the flexible arm section being able to flexibly pivot about the pivot pin, thus allowing the cutting insert 16 to move in and out of the longitudinal slot. At the forward axial end of the flexible arm section is attachment end 56, which is shaped to interact with a receiving recess located on the cutting insert.

The particular shape of attachment end 56 can differ from the mushroomlike shape located at the forward-most axial end of the resilient arm in FIG. 2. In this particular embodiment, the attachment end is a semi-circular protrusion having a width slightly larger than the elongated flexible arm section with which it is integrally formed, thus creating a slight shoulder 64 between the two sections. Some alternative shapes for the attachment end include semi-ovals, semi-ellipses, parabolas, as well as other shapes capable of carrying the cutting insert such that the cutting insert and resilient arm are not permanently connected together. Regardless of its shape, the attachment end must be designed such that it is capable of carrying the cutting insert 16 in a replaceable manner.

Figures 3, 5, 6:
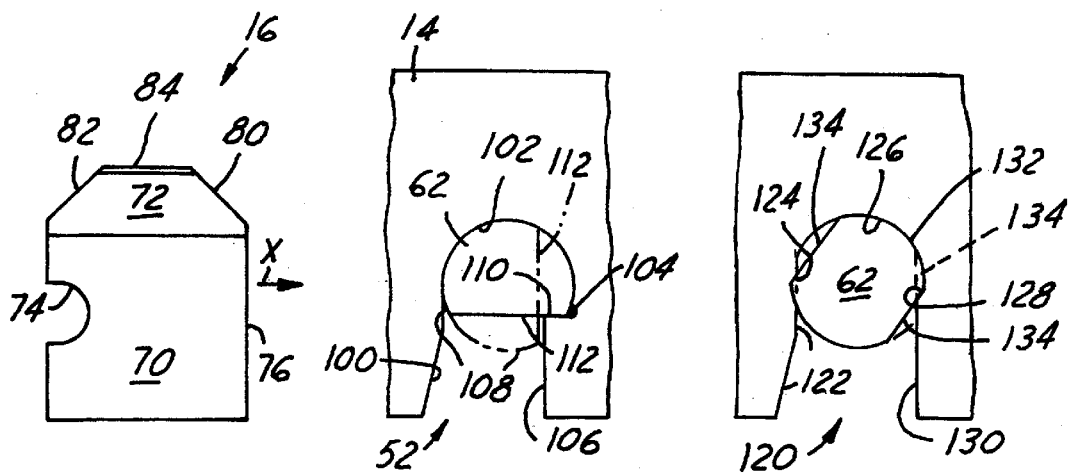
FIG. 3 is an enlarged view of the cutting insert shown in FIG. 2.
FIG. 5 is an enlarged view of the pivot pin seen in FIG. 2.
FIG. 6 is an enlarged view of a second embodiment of the pivot pin seen in FIG. 2.

Referring now to FIG. 3, replaceable cutting insert 16 is seen in greater detail and generally includes a main body portion 70 and a recessed cutting portion 72. The perspective of FIG. 3, as well as that of FIGS. 1 and 2, shows the leading rotational side of cutting insert 16, that is, the side of the insert that first confronts a cutting surface as the tool is rotating in a clockwise direction. Cutting insert 16 is composed of a high strength, wear resistant material, such as carbide, suitable for cutting, deburring, and chamfering a metal workpiece. The rearward end of the cutting insert includes an attachment recess 74 which is a semi-circular recess designed to receive the attachment end of the resilient arm. The forward end 76 of the cutting insert is in close proximity with a forward interior wall 78 of the longitudinal slot 34, seen in FIG. 2. The amount of space between the forward end and the forward interior wall is not so small that the cutting insert is pinched by the wall and thus prevented from radially moving in and out of the longitudinal slot, nor is that amount of space so large that the cutting insert could simply become unattached from the resilient arm. Rather, the attachment head 56 of the resilient arm is press fitted into the attachment recess 74, such that the cutting insert is non-permanently attached to the arm and is prevented from being pulled off of the arm in the forward axial direction by the presence of the forward interior wall 78. The degree of retention exerted by the attachment recess onto the attachment head can range from a rather loose fit allowing the cutting insert to rotate while mounted on the resilient arm to a rather tight fit wherein the cutting insert is unable to move with respect to the attachment head.

Referring again to FIG. 3, the recessed cutting portion 72 is set back from the main body portion 70, thus making its thickness less than that of the main body portion, and generally includes a forward cutting edge 80, a rearward cutting edge 82, and a top edge 84. As the rotating deburring tool 10 is advanced in a forward axial direction X, the forward cutting edge is the first surface on the cutting insert to confront an outer circumferential opening of a borehole. Once forward cutting edge 80 has deburred and chamfered the desired opening, the interior surface of the borehole will exert a force on the cutting insert which will cause it to retract into the longitudinal slot. The cutting insert will remain in this retracted position as it passes through the borehole, until it emerges from a backside opening. Subsequently, the forward axial movement X of the tool will be halted and it will begin to reverse in an opposite axial direction, at which point rearward cutting edge 82 will be the first surface of the cutting insert to contact the circumferential edge of a backside opening. Accordingly, when the forward cutting edge is deburring a frontside borehole opening, the rearward cutting edge is not deburring, and vice-versa. The topside edge 84 is generally parallel with the longitudinal axis of the tool and is slightly rounded such that it does not score or otherwise damage the interior surface of the borehole as the tool passes through it. The trailing rotational side of the cutting insert (not seen) is typically a flat planar surface having the same perimeter as the leading rotational side seen in the Figures. However, the trailing side could include one or more recesses, such as recessed cutting portion 72, or other surface features.

Figure 4:
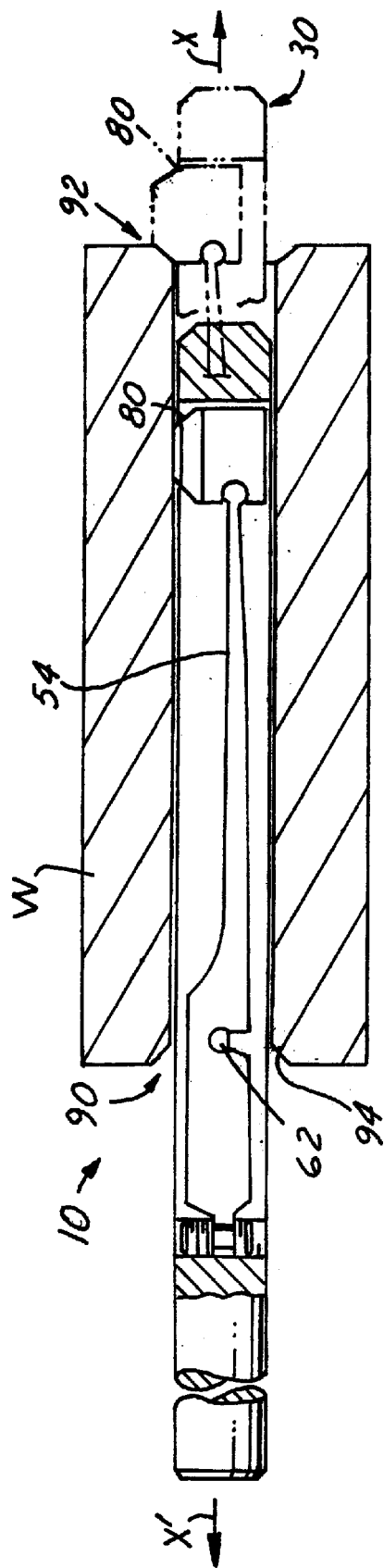
FIG. 4 is a cutaway view of the deburring tool seen in FIG. 2 passing through the borehole of a workpiece.

In operation, the deburring tool is inserted into and driven by a machine that rotates the tool at a high velocity while advancing and reversing the tool in an axial direction such that the tool is capable of removing burrs and placing chamfers on circumferential edges surrounding both a front side opening and a back side opening of a borehole. Referring now to FIG. 4, deburring tool 10 is seen in mid-operation as it passes through a borehole in a workpiece W such that cutting insert 16, seen in phantom, emerges from backside opening 92. At the beginning of the operation, the rotating deburring tool is advanced in an axial direction X until the forward cutting edge 80 contacts the circumferential edge surrounding a front side opening 90 of the borehole. As the forward cutting edge contacts the opening, it removes all burrs and other surface defects that may have been created from the boring process, and creates a front side chamfer 94. Further advancement of the tool in axial direction X causes the interior surface of the borehole to exert a radially inward force upon the cutting insert. This force causes resilient arm 14 to flex about pivot pin 62, such that the flexible arm section 54, and hence the cutting insert, is retracted within longitudinal slot 34. Once the cutting insert is retracted into the longitudinal slot, as seen in solid lines in FIG. 4, the deburring tool continues to rotate and advance in the forward axial direction X without damaging the interior of the borehole. This advancement continues until the forward axial end 30 of the arbor emerges from the borehole and there is no longer a radially inward force being exerted against the cutting insert. Once the tool has been axially advanced far enough that the cutting insert is free to again extend out of the longitudinal slot, as seen in phantom, forward axial movement is stopped and the tool is reversed in an axial direction X' such that rearward cutting edge 82 contacts the circumferential edge surrounding the back side opening 92. The tool deburrs and places a chamfer on the back side opening in a manner similar to that previously described, except the tool is now being moved in an axial direction X', opposite to the axial direction X. As the cutting insert is drawn back through the borehole, the interior surface of the bore again exerts an inwardly directed radial force against the cutting insert which causes it to retract within the longitudinal slot. Once the cutting insert has moved far enough in the axial direction X' such that it has been completely withdrawn from the borehole, the cutting insert again extends out of the longitudinal slot and the tool assumes its original position.

A notable advantage of the deburring tool of the present invention over that of the prior art, is its easily replaceable cutting insert. In referenced U.S. Pat. No. 5,358,363, the resilient arm section and the cutting insert are a single, integral component. Thus, replacement of the worn cutting insert requires replacement of the entire component, including the resilient arm. The deburring tool of the present invention is designed such that resilient arm 14 and cutting insert 16 are separate components, thus allowing replacement of the cutting insert only and obviating the disposal of an otherwise perfectly good resilient arm component. To replace the cutting insert, pivot pin 62 must first be rotated such that it releases the resilient arm and allows it to freely pivot about mounting pin 60, thereby making the resilient arm and cutting insert accessible to the operator. At this point, the worn cutting insert is removed from attachment end 56, a new cutting insert is added, and the resilient arm section is returned to its position within the longitudinal slot, as will subsequently be explained in further detail. Two embodiments of the pivot pin are shown, a first embodiment in FIG. 5 and a second embodiment in FIG. 6, both of which are capable of being incorporated into the deburring tool of the present invention.

Referring now to the first pivot pin embodiment seen in FIG. 5, an enlarged pivot pin 62 in solid lines is in a locked position, while the enlarged pivot pin drawn in phantom lines represents an unlocked position; the two positions being separated by approximately ¼ turn or 90°. The pivot recess 52 is a notch located on the bottom side of resilient arm 14, as previously mentioned, and generally includes a rearward lead in portion 100, main recess portion 102, a flat stop portion 104, and a forward lead in portion 106. The rearward and forward lead in portions together form the opening to pivot recess 52 and extend at an angle such that the mouth of the opening is wider than portions of the opening located further towards the center of the resilient arm, thus facilitating easy reception of the pivot pin 62 by the recess slot. Extending from one end of the rearward lead in portion is the main recess portion 102, which is of an arcuate shape and is sized to receive a rounded head portion 108 of the pivot pin. The main recess extends from the rearward lead in portion to the flat stop portion 104, which provides the feature responsible for locking the resilient arm into place on the pivot pin. As seen, flat stop portion 104 includes a shoulder 110 that prevents the resilient arm from simply sliding off of the pivot pin. When the pivot pin is in the locked position, represented by solid lines, the shoulder 110 engages a flat section 112 of the pivot pin, thus preventing the resilient arm from separating from the pivot pin. However, if the pivot pin is engaged with an appropriate tool, such as a screwdriver, alien wrench, etc., and rotated to the unlocked position, seen in phantom, shoulder 110 of the resilient arm no longer engages flat section 112 and thereby does not lock the resilient arm in place. Once the pivot pin is in the unlocked position, the resilient arm is free to swing about the mounting pin 60, as is best seen in FIG. 7.

Turning now to the second pivot pin embodiment seen in FIG. 6, pivot pin 62 in solid lines represents a locked position, while the pivot pin drawn in phantom lines represents an unlocked position. The pivot recess 120 is similar to pivot recess 52, however, pivot recess 120 has somewhat of a different interior perimeter and generally includes a rearward lead in portion 122, a first shoulder 124, a main recess portion 126, a second shoulder 128, and a forward lead in portion 130. Located at one end of rearward lead in portion 122 is the first shoulder 124, which cooperates with the pivot pin such that the two components may be secured together. Main recess portion 126 is of an arcuate shape that extends between the first and second shoulders and is sized to receive a rounded head portion 132 of the pivot pin. When the pivot pin is in the locked position, represented by solid lines, first and second shoulders 124, 128 engage flat surfaces 134 of the pivot pin, thus preventing the resilient arm from separating from the pivot pin. However, if the pivot pin is engaged with an appropriate tool, such as a screwdriver, alien wrench, etc., and rotated to the unlocked position, seen in phantom, the shoulders no longer engage flat sections 134 and thereby do not lock the resilient arm in place. Once the pivot pin is in the unlocked position, the resilient arm is free to swing about the mounting pin 60, as is best seen in FIG. 7.

Figure 7:
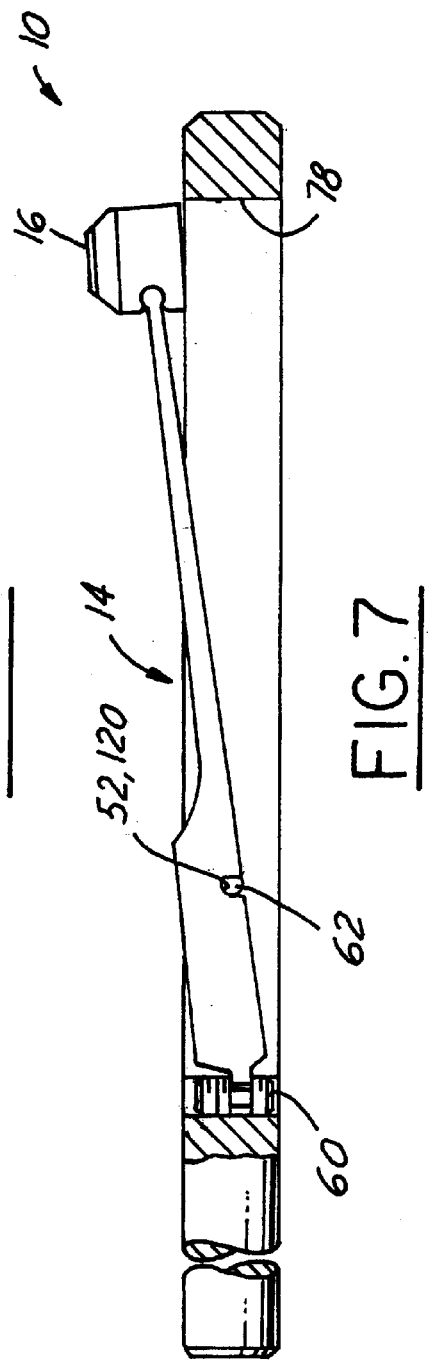
FIG. 7 is a cutaway view of the deburring tool seen in FIG. 2, wherein the resilient arm is extended such that the cutting insert can be replaced.

Referring now to FIG. 7, the resilient arm and cutting insert are shown being easily lifted out of the longitudinal slot for replacement of a worn cutting insert. Once lifted out of the slot, cutting insert 16 is removed from the attachment end 56 and a new cutting insert is attached. It should be noted, when the pivot pin 62 is in the locked position, the cutting insert is prevented from radially extending out of the slot to the extent seen in FIG. 7. Even at its most extended position, such as that seen in FIG. 2, the cutting insert is at least partially located within the longitudinal slot, and therefore is prevented from being removed from the attachment end in the forward axial direction by the presence of forward interior wall 78. When the pivot pin is in the unlocked position, the resilient arm is free to pivot such that the cutting insert is located completely outside of the longitudinal slot and therefore can be removed in the forward axial direction because there is no forward wall to prevents it from doing so. Once the cutting insert is replaced, the resilient arm is pivoted back into place within the longitudinal slot, the pivot pin is rotated back into the locking position, and the tool is again ready to be used. Moreover, this replacement operation can be performed while the tool remains mounted in the machine spindle.

It will thus be apparent that there has been provided in accordance with the present invention a deburring tool having a replaceable cutting insert which achieves the aims and advantages specified herein. It will, of course, be understood that the foregoing description is of preferred exemplary embodiments of the invention and that the invention is not limited to the specific embodiments shown. Various changes and modifications will become apparent to those skilled in the art and all such changes and modifications are intended to be within the scope of the present invention.

What is claimed is:

1. A deburring tool for deburring an opening of a borehole, comprising:

an elongated arbor having a forward axial end, a rearward axial end, and a longitudinal slot extending between said forward and rearward ends, a mounting pin carried by said arbor and located at a first axial position between said forward and rearward ends, a pivot pin carried by said arbor and located at a second axial position between said forward end and said mounting pin, a resilient arm received in said longitudinal slot and including a terminal end for coupling said resilient arm to said arbor via said mounting pin, an attachment end, and a pivot recess for allowing said resilient arm to flex about said pivot pin, and a replaceable cutting insert having a forward cutting edge and an attachment recess for receiving said attachment end of said resilient arm, wherein said replaceable cutting insert radially extends out of said longitudinal slot when said deburring tool is not engaging the borehole and said replaceable cutting insert radially retracts within said longitudinal slot when said debarring tool is engaging the borehole.

2. The debarring tool of claim 1, wherein said pivot pin can assume both a locked position where said resilient arm cannot separate from said pivot pin and an unlocked position where said resilient arm can separate from said pivot pin.

3. The debarring tool of claim 2, wherein when said pivot pin is in said unlocked position, said replaceable cutting insert extends out of said longitudinal slot such that said cutting insert may be replaced.

4. The deburring tool of claim 1, wherein said longitudinal slot includes a cutting recess proximate said forward axial end.

5. The deburring tool of claim 1, wherein said longitudinal slot includes a forward interior wall which is capable of preventing said cutting insert from separating from said attachment end.

6. The deburring tool of claim 1, wherein said mounting pin includes a threaded section for threadingly coupling said pin to said arbor, and a non-threaded section for fixedly receiving said terminal end of said resilient arm.

7. The deburring tool of claim 1, wherein said pivot recess and said pivot pin include a locking feature for securing said resilient arm to said pivot pin.

8. The deburring tool of claim 7, wherein said pivot recess locking feature is a retention shoulder and said pivot pin locking feature is a flat section.

9. The deburring tool of claim 1, wherein said replaceable cutting insert is comprised of carbide.

10. The deburring tool of claim 1, wherein said replaceable cutting insert further includes a rearward cutting edge for deburring a backside opening of a borehole.

11. A deburring tool for deburring both a frontside and backside opening of a borehole, comprising:

an elongated cylindrical arbor having a forward axial end, a rearward axial end, and a longitudinal slot extending between said forward and rearward ends, a mounting pin inserted into said arbor in a direction transverse to the longitudinal axis of said arbor and being located at an axial position proximate to a rearward end of said longitudinal slot, a pivot pin inserted into said arbor in a direction transverse to the longitudinal axis of said arbor, said pivot pin being located at an axial position between said forward end and said mounting pin, and said pivot pin including a first locking feature, a resilient arm received in said longitudinal slot and including a terminal end for coupling said resilient arm to said arbor via said mounting pin, an attachment end, and a pivot recess for engaging said pivot pin and allowing said resilient arm to flex about said pivot pin, said pivot recess having a second locking feature, and a replaceable cutting insert having a forward cutting edge for deburring a frontside opening, a rearward cutting edge for deburring a backside opening, and an attachment recess for receiving said attachment end of said resilient arm, wherein said first and second locking features can assume a locked position causing said resilient arm to be attached to said pivot pin, and said first and second locking features can assume an unlocked position causing said resilient arm to be unattached to said pivot pin such that said replaceable cutting insert extends out of said longitudinal slot thereby allowing replacement of said insert.

12. A method for replacing a cutting insert of a deburring tool, said method comprising the steps of:

(a) providing a deburring tool having an elongated arbor, a pivot pin including a first locking feature, a resilient arm including a pivot recess with a second locking feature, and a first cutting insert attached to said resilient arm, (b) adjusting at least one of said first and second locking features such that said resilient arm becomes unattached from said pivot pin, (c) extending said unattached resilient arm and said first cutting insert out of said arbor, and (d) replacing said first cutting insert with a second cutting insert.

* * * * *